(12) United States Patent
Wolf et al.

(10) Patent No.: US 9,103,115 B2
(45) Date of Patent: Aug. 11, 2015

(54) SHEET-LIKE FINISHING ELEMENT

(75) Inventors: Richard Wolf, Petersaurach (DE);
Michael Wolf, Petersaurach (DE)

(73) Assignee: WOLF BAVARIA GMBH, Heilsbronn (DE)

( * ) Notice: Subject to any disclaimer, the term of this patent is extended or adjusted under 35 U.S.C. 154(b) by 0 days.

(21) Appl. No.: 13/992,352

(22) PCT Filed: Dec. 7, 2011

(86) PCT No.: PCT/EP2011/006141
§ 371 (c)(1),
(2), (4) Date: Nov. 15, 2013

(87) PCT Pub. No.: WO2012/076164
PCT Pub. Date: Jun. 14, 2012

(65) Prior Publication Data
US 2014/0054108 A1    Feb. 27, 2014

(30) Foreign Application Priority Data

Dec. 8, 2010   (DE) .................. 20 2010 016 366 U

(51) Int. Cl.
*E04B 1/84*    (2006.01)
*E04B 1/86*    (2006.01)
(Continued)

(52) U.S. Cl.
CPC ............. *E04B 1/8409* (2013.01); *B32B 3/12* (2013.01); *E04B 1/90* (2013.01); *E04C 2/3405* (2013.01); *E04F 15/203* (2013.01); *B32B 2307/102* (2013.01); *B32B 2307/304* (2013.01);
(Continued)

(58) Field of Classification Search
USPC ......... 181/292, 291, 290, 285, 284, 294, 288; 52/144, 145
See application file for complete search history.

(56) References Cited

U.S. PATENT DOCUMENTS 3,597,891 A * 8/1971 Martin ............................ 52/145
4,084,367 A * 4/1978 Saylor et al. .................. 428/113
(Continued)

FOREIGN PATENT DOCUMENTS

DE     24 23 013       11/1975
DE     3202078 A1 *   8/1983    ............. G10K 11/16
(Continued)

OTHER PUBLICATIONS

International Search Report with Written Opinion corresponding to International Patent Application No. PCT/EP2011/006141, mailed Apr. 5, 2012—Search Report listing and English translation of the Written Opinion only.

*Primary Examiner* — Edgardo San Martin
(74) *Attorney, Agent, or Firm* — Lathrop & Gage LLP

(57) ABSTRACT

A panel-like/sheet-like finishing element (11) for covering floors and walls, for example in the renovation of old buildings, is provided with heat-insulating and sound-absorbing properties if its interior (15) is provided, between outer covering layers (12, 13), with channel-forming undulating supporting structures (16) filled with high-density coarse granules (21). The supporting structures (16) are connected to the covering layers (12, 13) along the vertex lines (17) so as to provide wet-strength action, and the interior (15), between these covering layers, is sealed by enclosing edging strips (19) to provide wet-strength action, with the simultaneous inclusion of moisture-tight, but vapour-permeable, supporting layers (20) on covering layers (12, 13). If this finishing element (11) is mounted vertically, the granule-filled channels (14) run horizontally.

12 Claims, 1 Drawing Sheet

(51) Int. Cl.
  *E04B 1/90* (2006.01)
  *E04C 2/34* (2006.01)
  *E04F 15/20* (2006.01)
  *B32B 3/12* (2006.01)
  *E04B 1/82* (2006.01)
  *E04B 1/74* (2006.01)

(52) U.S. Cl.
  CPC ......... *B32B2607/00* (2013.01); *B32B 2607/02* (2013.01); *E04B 2001/747* (2013.01); *E04C 2002/345* (2013.01); *E04C 2002/3466* (2013.01)

(56) References Cited

U.S. PATENT DOCUMENTS

| | | | | |
|---|---|---|---|---|
| 4,241,806 A * | 12/1980 | Metzger | | 181/284 |
| 4,441,581 A * | 4/1984 | Sommerhalder | | 181/286 |
| 4,661,392 A * | 4/1987 | Kapstad | | 428/182 |
| 4,796,397 A * | 1/1989 | Capaul | | 52/144 |
| 4,989,688 A * | 2/1991 | Nelson | | 181/287 |
| 5,685,124 A * | 11/1997 | Jandl, Jr. | | 52/783.11 |
| 5,690,035 A * | 11/1997 | Hatayama et al. | | 105/452 |
| 5,723,831 A * | 3/1998 | Martin et al. | | 181/287 |
| 5,907,930 A * | 6/1999 | Ricco, Sr. | | 52/79.1 |
| 6,148,586 A * | 11/2000 | Jandl | | 52/783.17 |
| 6,158,176 A * | 12/2000 | Perdue | | 52/144 |
| 6,174,587 B1 * | 1/2001 | Figge, Sr. | | 428/178 |
| 7,063,184 B1 * | 6/2006 | Johnson | | 181/290 |
| 7,127,865 B2 * | 10/2006 | Douglas | | 52/745.13 |
| 7,377,084 B2 * | 5/2008 | Swiszcz et al. | | 52/793.11 |
| 8,347,575 B2 | 1/2013 | Bierwirth | | 52/403.1 |
| 8,579,079 B2 * | 11/2013 | Beauvilain et al. | | 181/290 |
| 2002/0144861 A1 * | 10/2002 | Wisniewski | | 181/285 |
| 2005/0194210 A1 * | 9/2005 | Panossian | | 181/293 |
| 2005/0263346 A1 * | 12/2005 | Nishimura | | 181/290 |
| 2006/0037815 A1 * | 2/2006 | Schabel | | 181/290 |

FOREIGN PATENT DOCUMENTS

| | | | | |
|---|---|---|---|---|
| DE | 197 09 620 | | 9/1998 | |
| DE | 19709620 A1 * | | 9/1998 | |
| DE | 198 09 849 | | 9/1999 | |
| DE | 198 12 747 | | 9/1999 | |
| DE | 19809849 A1 * | | 9/1999 | ............... E04B 1/82 |
| DE | 19812747 A1 * | | 9/1999 | ............... F16S 1/04 |
| DE | 20 2009 004235 | | 8/2010 | |
| GB | 2268199 A * | | 1/1994 | ............... E04C 2/26 |
| JP | 03199571 A * | | 8/1991 | ............... E04F 15/18 |
| JP | 04106243 A * | | 4/1992 | ............... E04B 1/82 |
| JP | 06017493 A * | | 1/1994 | ............... E04B 1/90 |
| WO | WO 9840574 A1 * | | 9/1998 | ............... E04B 1/86 |

* cited by examiner

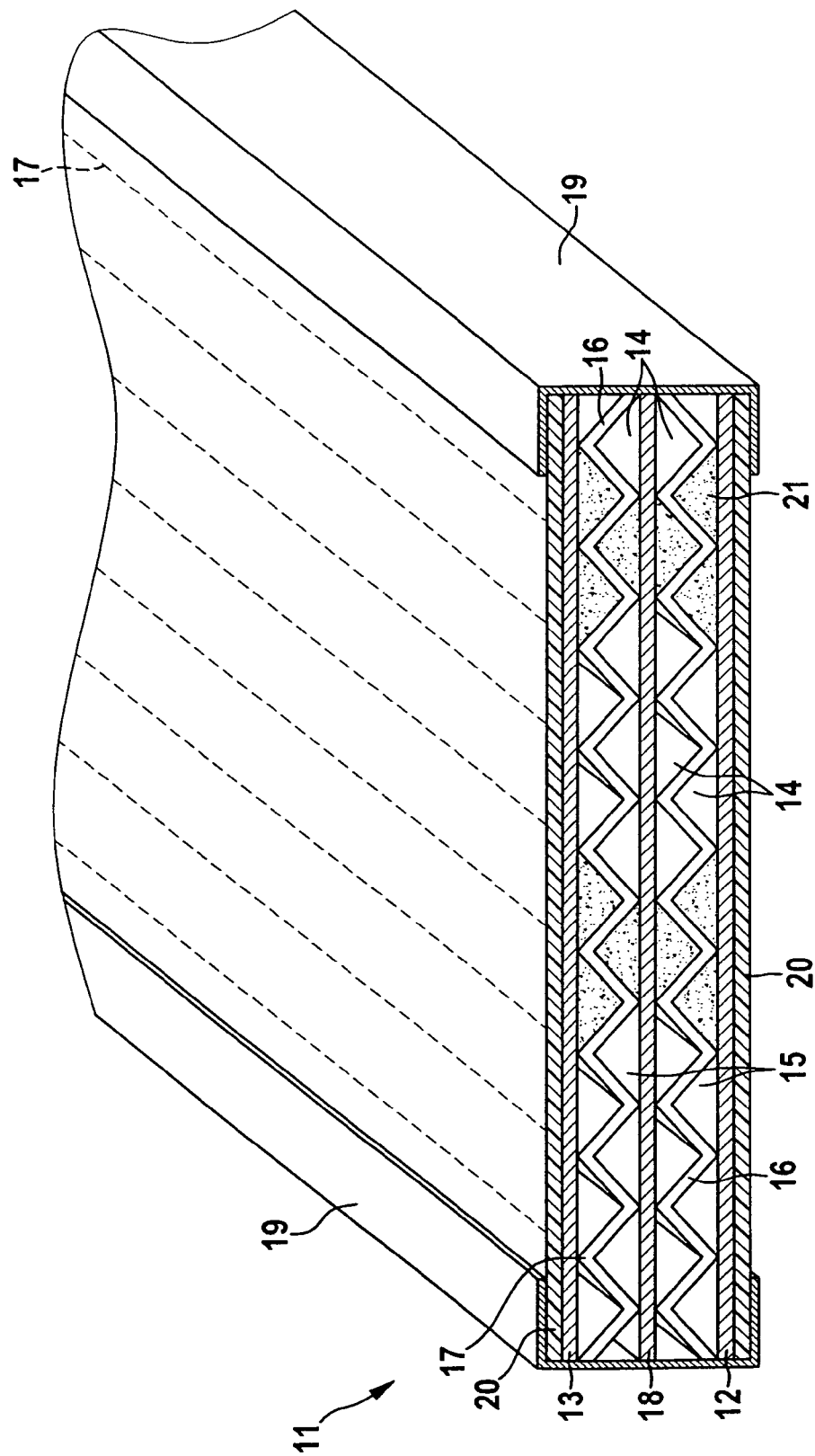

SHEET-LIKE FINISHING ELEMENT

BACKGROEUND OF THE INVENTION

The invention relates to a finishing element of the type described hereinafter.

When renovating old builds, for example, it is known to cover uneven floors or unsound walls with pressed chipboard to achieve an even surface for further fitting such as the laying of carpet underlay or application of wallpaper. The structure-borne sound transmission of such surfaces may, however, be of critical.

SUMMARY OF INVENTION

The present invention therefore addresses the technical problem of providing a finishing element that is, under all circumstances, sound-deadening, board-like, stable and load-bearing, as well as having heat-insulating properties, making possible a moisture-resistant option and being able to be constructed in a flame-retardant manner.

This problem is solved according to the features of the main claim, the dependent claims relating to expedient adaptations and developments. Accordingly, the basic configuration of the sheet-like/planar finishing element according to the invention is for it to be constructed not as a solidly compacted board but as a planar hollow member comprising an undulated or a honeycombed inner supporting structure between lower and upper cover layers, which are each thin in relation to the overall thickness of the finishing element, and comprising a filling of granular material, in particular in the form of burned and purified silica sand, in the channel-traversed interior between the cover layers on either side.

Air-filled cavities between the granular material of the channel filling afford the finishing element according to the invention heat-insulating properties; above all, however, the relatively high mass of the filling has sound-absorbing, i.e. sound-deadening, properties, which render said filling very effective at counteracting both the conduction of structure-borne sound along the adjoining cover layers and the transmission of through-sound.

With respect to intersecting undulating supporting structures, which are likewise in accordance with the invention, an undulating structure which is in either a single layer or a plurality of layers on either side of separating layers, in each case mutually parallel and thus defining channels, has the advantage from a manufacturing perspective of being able to fill the entire interior between the two outer cover layers with granular material, without the need for retrofitting, in one operation at the channel cross-sections which are open on one board side, whereas the opposite channel openings are, for example, temporarily closed by placing on a base, yet preferably sealed by bonding to edging. The end openings on the filling side are then also sealed by adhering edging.

According to an advantageous development of the present invention, a moisture-resistant material is used directly for the supporting structures and/or for the cover layers and separating layers. When said material consists of tough pulp polymer which is filled, specifically being comparatively highly filled with amorphous natural or artificial mineral wool of maximum fibre length, and comprises natural (gelatine or in particular starch) adhesive or aqueous silica solutions or even synthetic resin as a binding agent, then the finishing element proves to be water-repellent and fireproof, being virtually non-flammable even at the edges.

For vertical insertion, as a wall lining for example, of a finishing element in which the supporting structures are joined along the apex lines of their peaks to the cover- and separating layers, the channels, which are filled with granular material, of the undulating structures should be aligned preferably horizontally. Thus, in the event of local damage to a cover layer, for example as a result of a nail being hammered in, a channel portion laid thereover cannot leak.

This type of limitation is not necessary where, in the event of an essential increase in the mechanical load-bearing capacity of such optionally fire- and water-resistant finishing elements, the intersecting or mutually parallel undulating layers of the supporting structures are oriented transverse rather than parallel to the cover- and separating layers. With a honeycombed supporting structure which opens out towards the cover layers, the peak/apex extensions of the supporting structures are no longer bonded or otherwise cohesively connected to the adjacent layers but rather their channels are closed by the cover- and separating layers. The channel-shaped cavities in the interior of the finishing element thus now no longer extend parallel but rather orthogonally to the cover- and separating layers. The short supporting structures, now mutually shoring up one another by means of their surface lines, have an extremely high buckling strength and remain as such even in the event of fire if they are produced, as stated, from mineral or cellulose fibres. These advantageous mechanical properties can be further enhanced if, instead of the triangular or sinusoidal supporting structures which are upright between the cover- and separating layers, a columnar structure consisting of upright hollow members is selected, preferably in the tightest possible circular parquet arrangement, specifically as upright honeycombed structures of triangular or hexagonal cross-section.

BRIEF DESCRIPTION OF THE DRAWINGS

FIG. 1 shows the finishing element (drawn somewhat magnified) in an oblique view directed at an end face which is not yet sealed.

DETAILED DESCRIPTION OF THE INVENTION

A schematic diagram for one embodiment of the finishing element according to the invention in its basic configuration and the subsequent description thereof serve as examples in illustration of the solution according to the invention. The only figure of the drawings shows such a finishing element (drawn somewhat magnified) in an oblique view directed at an end face which is not yet sealed.

The finishing element 11 drawn, which is planar in a board-like manner, has an interior 15 between a lower cover layer 12 and an upper cover layer 13, which interior is traversed by mutually parallel channels 14. When the finishing element 11 is installed vertically, the channels 14 extend horizontally. Said channels are defined with respect to one another by longitudinal undulating supporting structures 16 which are each in contact via their apex lines 17 with the inner faces of the cover layer 12 or 13.

In this embodiment there are two layers of supporting structures 16, specifically on either side of a separating layer 18 parallel to the cover layers 12, 13. The example drawn is of two supporting structures 16 which are approximately triangular in cross-section; yet these supporting structures 16 may equally be approximately sinusoidal in cross-section or have cross-sections which meander in the shape of a hollow cuboid.

The cover- and separating layers 12, 13, 18 and their supporting structures 16 consist of lightweight, thin materials such as, in particular, pulp. The apex lines 17 of the supporting structures 16 are connected in a positive or, preferably, materially integral manner, in particular being bonded in a moisture-resistant manner, to the adjoining cover- and optionally separating layers 12, 13, 18.

The ready-to-use finishing element 11 is fully hermetically bonded using wet-strength edging 19 (edging strips drawn over the edges), preferably with wet-strength protective layers 20 being applied to at least one of the outer faces of the two cover layers 12, 13. The wet-strength materials may be varnishes or like moisture-impermeable protective layers; preferably, however, said materials are plastics films applied to at least one side or fixed all around. In the interest of good room air conditions, said plastics films are preferably impermeable to water yet allow diffusion, for example being made of polytetrafluoro ethylene. In principle it is sufficient to coat the separating layer 18 with a thin, oriented ePTFE membrane to render the finishing element 11 moisture-impermeable yet vapour-permeable overall.

One cross-sectional end face (on the side which is visible in this case) remains initially uncovered so as to be accessible in order for the channels 14 to be filled with granular material 21 and then finally to also be bonded in a hermetically tight manner.

A board-like, planar finishing element 11 for surfacing floors and walls, for example during the course of the renovation of an old build, thus includes, according to the invention, heat-insulating and sound-absorbing properties when its interior 15 between outer cover layers 12, 13 and optionally separating layers 18 is traversed by channel-forming supporting structures 16 which undulate in an approximately curved or angular manner, the mutually parallel channels 14 which are thus delimited from one another being filled with coarse-grained granular material 21 of comparatively high thickness. The supporting structures 16 are connected in a wet-strength manner along apex lines 17 to the layers 12, 13 and optionally 18, the interior 15 therebetween is wet-strength sealed by circumferential edging strips 19, optionally also being enclosed by moisture-tight, moisture-resistant yet vapour-permeable protective layers 20 on at least one of the layers 12, 13 or optionally 18. When this finishing element 11 is mounted vertically, the channels 14 filled with granular material extend horizontally.

LIST OF REFERENCE NUMERALS

11 Finishing element
12 Lower cover layer (of 11)
13 Upper cover layer (of 11)
14 Channels (in 15 along 17)
15 Interior (between 12 and 13)
16 Supporting structures (in 15)
17 Apex lines (of 16, 14)
18 Separating layer (in 15; between 12, 13 or 16, 16)
19 Edging (around 11)
20 Protective layers (on 12, 13 and/or 18)
21 Granular material (in 14)

We claim:

1. Sheet-like finishing element comprising, in its interior between upper and lower cover layers or separating layers, supporting structures which undulate in cross-section in a curved or angular manner and define channels filled with granular material,
   wherein the upper and lower cover layers or separating layers and the supporting structures have highly-filled tough pulp polymer comprising natural gelatine or starch adhesive or aqueous silica solutions or even synthetic resin as a binding agent, and
   wherein the finishing element is fully wet-strength sealed by means of edging strips.

2. Finishing element according to claim 1, characterised in that, in cross-section, the supporting structures have an extension which either meanders in the shape of a hollow cuboid or is triangular or sinusoidal.

3. Finishing element according to claim 1, characterised in that channels of the supporting structures which extend orthogonally to the cover- and separating layers are closed by the cover layers and the separating layers.

4. Finishing element according to claim 1, characterised in that its interior has upright hollow members as supporting structures.

5. Finishing element according to claim 1, characterised in that the supporting structures are connected cohesively to the cover layer.

6. Finishing element according to claim 1, characterised in that at least one of the cover- or separating layers is fitted with a moisture-resistant yet vapour-permeable protective layer.

7. Finishing element according to claim 1, characterised in that its cover- and separating layers and/or its supporting structures have long-fibred amorphous natural or artificial mineral wool.

8. Finishing element according to claim 1, characterised in that the granular material in the channels is burned silica sand.

9. Finishing element according to claim 4, characterised in that the upright hollow members are upright honeycomb structures of either triangular or hexagonal cross-section.

10. Finishing element according to claim 5, characterised in that the supporting structures are wet-strength bonded to the cover layers.

11. Finishing element according to claim 5, characterized in that the supporting structures are connected cohesively to the cover layers and the separating layer.

12. Finishing element according to claim 11, characterised in that the supporting structures are wet-strength bonded to the cover layers and the separating layer.

* * * * *